US009479603B2

(12) United States Patent
Chitturi et al.

(10) Patent No.: US 9,479,603 B2
(45) Date of Patent: Oct. 25, 2016

(54) INTEGRATION OF ACTIVE INTEREST INFORMATION WITH AN ADDRESS BOOK

(75) Inventors: Suresh Chitturi, Irving, TX (US); James Paul Warden, Irving, TX (US); Shiladitya Sircar, Kanata (CA); Michael Rao, Kanata (CA); Vikram Rattan Kewalramani, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 930 days.

(21) Appl. No.: 12/715,087

(22) Filed: Mar. 1, 2010

(65) Prior Publication Data

US 2011/0214066 A1    Sep. 1, 2011

(51) Int. Cl.
G06F 3/00 (2006.01)
H04L 29/08 (2006.01)
G06Q 10/10 (2012.01)

(52) U.S. Cl.
CPC ............ *H04L 67/22* (2013.01); *G06Q 10/10* (2013.01)

(58) Field of Classification Search
USPC .................................................. 715/738, 739
See application file for complete search history.

(56) References Cited

U.S. PATENT DOCUMENTS

| 6,138,908 | A | 10/2000 | Moon et al. |
| 6,349,327 | B1 * | 2/2002 | Tang et al. ............ 709/205 |
| 7,440,746 | B1 | 10/2008 | Swan |
| 7,519,658 | B1 | 4/2009 | Anglin |
| 7,634,463 | B1 | 12/2009 | Katragadda et al. |
| 2004/0225525 | A1 | 11/2004 | Weitzman |
| 2007/0156805 | A1 * | 7/2007 | Bristol .............. H04L 12/581 709/202 |
| 2011/0145270 | A1 * | 6/2011 | Christopher et al. ....... 707/769 |

FOREIGN PATENT DOCUMENTS

WO    2010010446 A1    1/2010

OTHER PUBLICATIONS

International Search Report and Written Opinion issued Jul. 28, 2010 in respect of corresponding PCT Application No. PCT/US2010/25760.
Badulescu, Delivering the optimal end-user experience: Ericsson Multimedia Communication Suite.
Converged Address Book Architecture, Candidate Version 1.0—Sep. 22, 2009, Open Mobile Alliance Ltd.
Canadian Office Action; Application No. 2,791,449; Sep. 9, 2014; 2 pages.
Extended European Search Report from the European Patent Office for Application No. 10186618.4, dated May 26, 2011.
Canadian Office Action; Application No. 2,791,449; Nov. 23, 2015; 5 pages.
European Examination Report; Application No. 10186618.4; Jun. 24, 2016; 8 pages.

* cited by examiner

*Primary Examiner* — Thanh Vu
(74) *Attorney, Agent, or Firm* — Conley Rose, P.C.; J. Robert Brown, Jr.

(57) ABSTRACT

A system, method, and apparatus for integrating active interest information with an address book are provided. Active interest information is indicative of a current or ongoing interest of a first user and may be generated based on use of an application client by the first user. The active interest information is used to update an active interest field in a contact record describing the first user in an address book associated with a second user. The contact record may be updated by an address book client or a converged address book server. Provided is a converged address book server that manages the sharing and updating of active interest information and address books. The active interest information may also be updated using a personal contact card associated with the first user. Also provided is a method and apparatus for prompting communication between contacts based on active interest information.

7 Claims, 10 Drawing Sheets

INTEGRATION OF ACTIVE INTEREST INFORMATION WITH AN ADDRESS BOOK

FIELD OF TECHNOLOGY

The present disclosure relates generally to contact information in an address book, and in particular to integration of active interest information into a contact record describing a contact in an address book.

BACKGROUND

Many portable electronic devices (such as cellular telephones, smart telephones, portable computers, wireless PDAs, and mobile communications devices) enable communication with other persons and provide access to content through a wireless communications network. For example, portable electronic devices may provide access to a variety of data services including Internet services (such as portals, websites, and Internet-provided multimedia), Personal Information Management (PIM) services (associated with calendar events, task items, memos, or other personal information management data items), instant messaging, email messaging, or other social networking applications. In addition to providing access to information, portable electronic devices enable social interaction with other persons via voice communication and messaging.

One feature commonly found in a portable electronic device is an address book. An address book is an application for storing and accessing contact information. Traditionally, address books have included static contact information to assist a user of a portable electronic device in establishing a communication session with a contact stored in the address book. Typical examples of an address book include a phone directory, PIM contact items, and social networking "friends" lists. In some implementations, an address book may be managed on another electronic device such as a desktop or personal computer. A synchronization server or centralized storage server may provide synchronization of an address book to a portable electronic device. This may permit a convenient solution for a user to access an address book from a plurality of electronic devices, including the portable electronic device.

Over the history of portable electronic devices, the features associated with address books have evolved. For example, a network-enabled address book might make use of a network to exchange information among several address books. One type of network-enabled address book is a converged address book (CAB). This may also be referred to as centralized address book, common address book, coordinated address book, or other words that refer to an address book which comprises information exchanged via a network. In some cases, network-enabled address books may be stored at a network-based repository. By storing several converged address books at a network-based repository, a service provider may enable sharing of contact information and interworking of address books using standard data formats. The Open Mobile Alliance is a standardization group that has described the CAB as "an evolution of the address book [that] is expected to serve as a launch pad for similarly evolving services dependent upon contact information."

In some address books, a user may manually enter information about interests and hobbies of a contact. More recently, social networking tools allow a contact to share information about current thoughts, photos, or profile information. Typically, this information has been manually entered or uploaded by the contact into the social networking tool. The social network software may allow users of the social networking tool to obtain the current profile information regarding the contact. However, using the current features of an address book or shared profiles, it may be difficult to timely and accurately maintain information about the active interests of contacts in an address book.

BRIEF DESCRIPTION OF THE DRAWINGS

The disclosure refers to the following figures, in which like numerals describe substantially similar components throughout the several views.

DETAILED DESCRIPTION

Figure 1:
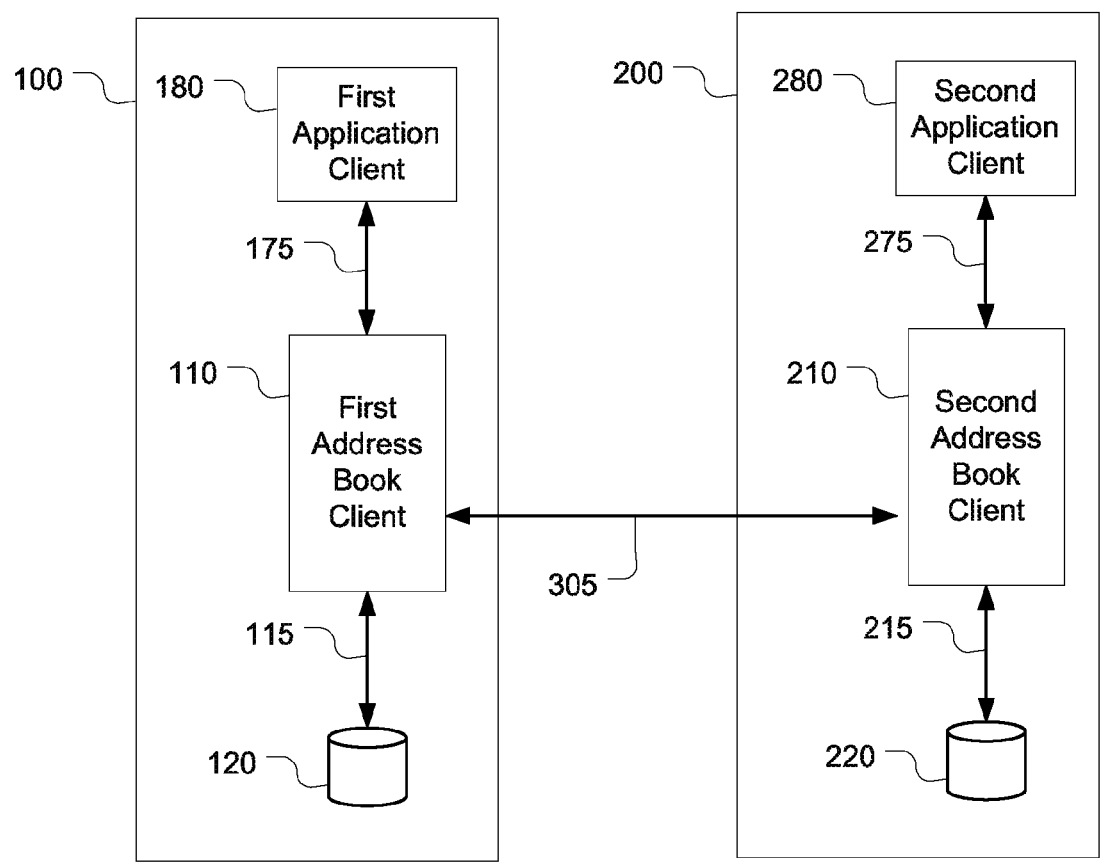
FIG. 1 is a diagram illustrating an example system in which an address book client may share active interest information with another address book client.

The present disclosure describes a method, apparatus, and system for updating an active interest field in a contact record describing a first user in an address book of a second user. The active interest field is updated based on active interest information associated with the first user and may be generated as a result of interaction with an application client. Furthermore the active interest information may be automatically generated, and may be different from user-generated interest descriptors.

Integration of active interest information with an address book may enhance the features of the address book, making it more dynamic and informative about contacts. For example, having the active interest information in a contact record may provide an improvement to the functionality of an address book. This may assist an address book client or a converged address book server to identify shared interests based on contact records in an address book. The present disclosure provides a method and apparatus for prompting communication between contacts based on active interest information in an address book.

In this disclosure, active interest information may comprise any information that indicates a current or ongoing interest of a contact and is generated based upon interaction by the contact with an application. The active interest information may be generated at a portable electronic device, address book client, agent application, or at another component of a converged address book system. Active interest information may also be referred to as active interest indicia, current interest information, implicit interest information or other terms that refer to information indicative of a current or ongoing interest of a user. Active interest information may not be the same as user-entered data about the interests and hobbies of the user.

Active interest information may be determined based on activity data associated with an application client. Activity data is information that describes an interaction by a user with an application client. For example, the application client may describe an activity of the user in the application client in activity data. Alternatively, a portable electronic device, application server, or agent application may describe an activity of the user in the application client by generating activity data. In another example, the activity data may describe patterns of usage of the application client, such as frequency of use or usage of various application clients belonging to a common class of applications.

In one embodiment, a first address book client may share active interest information via a network to another address book client or via a converged address book server. A converged address book server may provide access to store, retrieve, or maintain active interest information regarding several contacts in a network-enabled address book. In one embodiment of this solution, the inclusion of active interest information in contact records of an address book may enable coordination of social interactions. The active interest information may be processed to identify shared interests between two or more contacts. For example, a first user of a first address book client may be engaged in an activity that is related to a current interest of a second user of a second address book client. When a shared interest is identified, a portable electronic device, converged address book server, or other component may prompt a communication between the second user and the first user. For example, an address book client, associated with a second user, may provide a prompt to the second user to send a message to the first user based on the shared interest. Alternatively, an application client activated by the second user may prompt the communication between the second user and the first user based on the shared interest.

Referring now to FIG. 1, an example system is described in which an address book client may share active interest information based on activity data from an application client. In FIG. 1, a first portable electronic device 100 comprises a first address book client 110. The first address book client 110 may access (shown as double headed arrow 115) a first address book 120. While the first address book 120 is depicted in FIG. 1 as memory storage in the first portable electronic device 100, it should be understood that the first address book 120 may be stored in an external device (not shown). For example, the first address book client 110 may access 115 the first address book 120 via a wireless communications network, and may use one or more communication protocols for accessing information, such as extensible markup language (XML), hypertext transfer protocol (HTTP), structured query language (SQL), or any other protocol which allows the first address book client 110 to access 115 the first address book 120. Additionally, the first address book client 110 may have access to multiple address books. For example, the first address book 120 may comprise contact records obtained from more than one address book sources.

The first address book client 110 also has an application programming interface (API), shown as double headed arrow 175. The API is an interface implemented by a software program to enable interaction with other software. In FIG. 1, the API 175 enables interaction between the first address book client 110 and a first application client 180. The first application client 180 may be, for example, an application on the first portable electronic device 100 that provides a user interface (not shown) to the user of the first portable electronic device 100. As non-limiting examples, the first application client 180 may be a web browser, a media player, a messaging client, or any other application which involves interaction by the user. As further example, the first application client 180 may comprise a "remote control application" that is associated with a separate media application (either on the first portable electronic device 100 or on a separate device). It should be understood that it is not necessary for the first address book client 110 to be integrated or control the first application client 180 in any way. For example, the API 175 may be an interface whereby the first address book client 110 monitors information to or from the first application client 180 without a direct interface between the first application client 180 and the first address book client 110.

In FIG. 1, a second portable electronic device 200 has similar structural and logical elements as the first portable electronic device 100. The second address book client 210 has access (double headed arrow 215) to a second address book 220 and also has a second API 275 to a second application client 280. Furthermore, there is a communication link, depicted by double headed arrow 305 between the first portable electronic device 100 and the second portable electronic device 200. The communication link 305 could comprise, for example, a wireless communications network.

Turning now to an example embodiment of the present disclosure, the first address book client 110 obtains, via API 175, some activity data from the first application client 180. In this example, the first address book client 110 may monitor activity of the first application client 180 to obtain activity data, or may receive activity data directly from the first application client 180. After obtaining the activity data, the first address book client 110 may determine active interest information based on the activity data. In some cases, the activity data will already be in a form of active interest information. In other cases, the first address book client 110 or some other component of the first portable electronic device 100 may generate active interest information based on the activity data. When the first address book client 110 or some other component of the first portable electronic device 100 generates active interest information, the active interest information may also include information obtained via another source, such as the result of a database query, internet query, translation, conversion, or compression generated based upon the activity data. For example, a contact may be engaged in an activity (e.g. viewing content related to a specific sporting event in a media player) and the active interest information may comprise a tag that identifies the interest (e.g. "football" or an identification of a football team associated with the content).

The API 175 may comprise an agent (not shown) in some embodiments, where the agent has access to the first application client to collect activity data. The agent may also be referred to as an agent application, proxy application, helper application, or any other terms to refer to an agent that is capable of obtaining activity data associated with the first application client 180. In FIG. 1, the first application client 180 is shown as a component of the first portable electronic device 100. However, in other embodiments, the API 175 comprises an agent having access to a first application client on a separate device. For example, API 175 may be a remote monitoring application that collects activity data or active interest information from a first application client on a separate machine. The agent may utilize a variety of communication protocols and/or access protocols to access the first application client. Communication protocols may include, without limitation, extensible markup language (XML), hypertext transfer protocol (HTTP), structured query language (SQL), or any other protocol which enables communication between applications. Examples of access protocols may include, without limitation, short range radio frequency communication (such as Bluetooth™, Near Field Communication—NFC, Wireless USB, or others), wireless cellular technologies, wireless networking technologies, or wired connectivity (including USB, FireWire, HDMI, or others).

In one embodiment, the first application client 180 or the first address book client 110 may determine patterns of activity or analyze historical activity data to generate active interest information. For example, the application client 180 may create a local datastore that comprises a history of activities performed by a user (e.g. a list of media events viewed on a media player). Alternatively, a pattern of usage of an application client may also be used to obtain active interest information. For example, if a camera application is used frequently, the active interest information may indicate that "photography" is an active or ongoing interest of the user. Likewise, activity data associated with frequent use of a class of applications may also be used to obtain active interest information. Frequent use of social networking applications might be used to generate active interest information that indicates "socializing" as an active or ongoing interest. Frequent use of gaming applications, as a class of applications, might cause the active interest information to indicate an interest in "gaming." If activity data from a location based application suggests that the physical location of the device changes often, such as Global Positioning System (GPS) coordinates changing frequently, then the active interest information may indicate an interest in travelling.

The first address book client 110 communicates the active interest information, via the communication link 305, to the second address book client 210. In other embodiments, the active interest information may be communicated through a converged address book server, or via other communication methods. The second address book client 210 updates a contact record in the second address book 220, the contact record describing a contact associated with the first address book client 110. For example, the second address book client 210 updates an active interest field in the contact record based on the active interest information received from the first address book client 110. Because the active interest information was generated based upon the contact's use of the first application client, the updated active interest field may indicate a current or ongoing interest of the contact.

In addition to updating the contact record in the second address book 220, the second address book client 210 may optionally compare the active interest information with other activity data or other active interest information associated with the use of the second application client 280. For example, if the second address book client 210 receives the active interest information that suggests the contact associated with first address book client 110 is viewing a media stream, the second address book client 210 may determine if the user of the second portable electronic device 200 is also viewing the same media stream via the second application client 280. Alternatively, the second address book client 210 may compare other activity data, based on use of the second application client 280, with contact records in the second address book 220 to may identify a contact record having an active interest field related to the other activity data. In an optional feature, the second address book client 210, having identified the contact record with a related active interest field, may prompt a communication between the user of the second address book client 210 and the user of the first address book client 110. For example, prompting the communication may be an indication to the user of the second portable electronic device 200 that the contact identified by the contact record is also watching the same live internet video stream, allowing the user to call or send a message to the contact.

Figure 2:
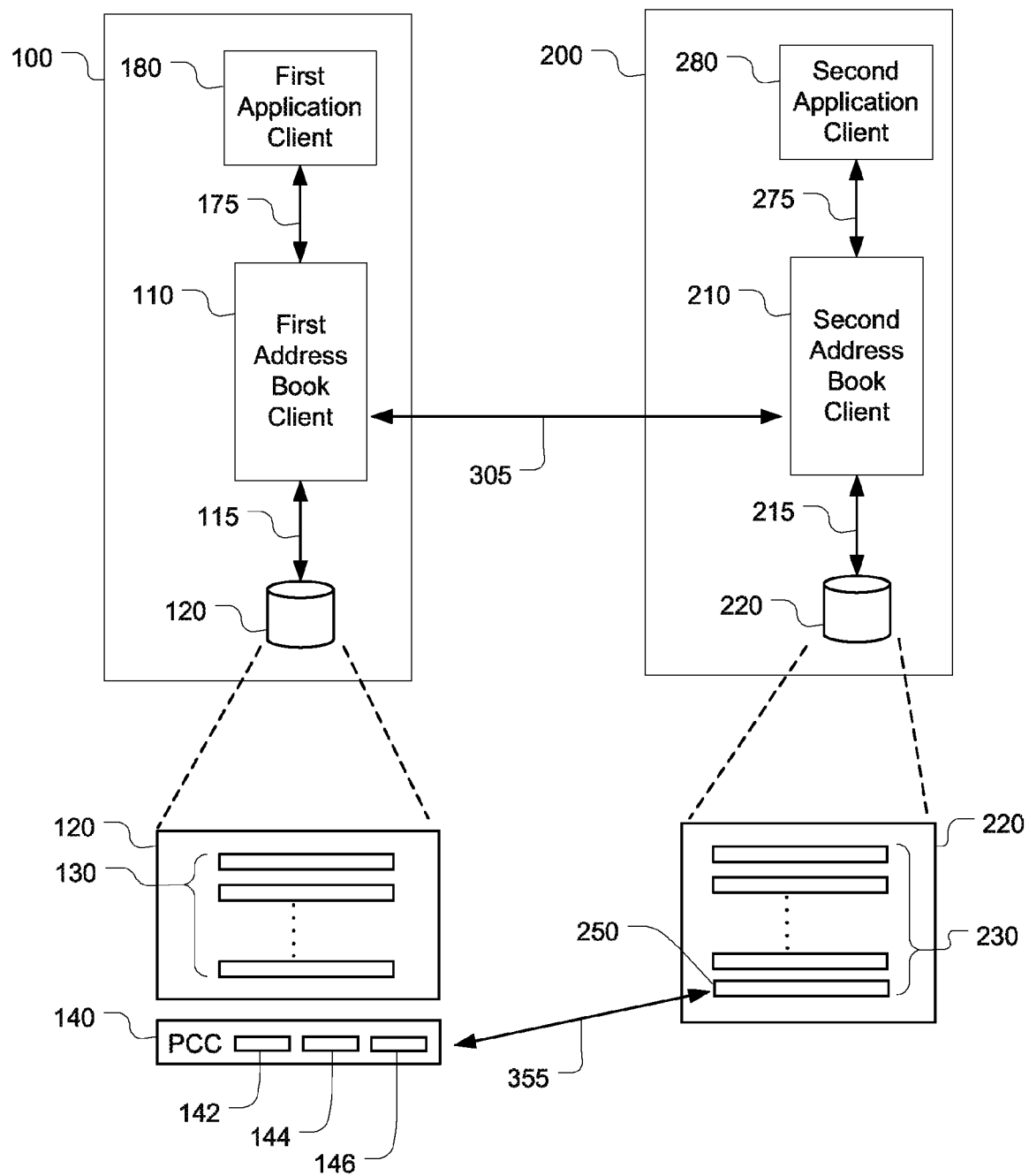
FIG. 2 is a diagram including an example data structure which may used by address book clients that share active interest information.

FIG. 2 provides a further example of the first address book client 110 sharing active interest information with the second address book client 210. In FIG. 2, the first address book 120 includes a plurality of contact records 130. In addition to the first address book 120, the first address book client 110 may also have access to user contact information called a personal contact card (PCC) 140. The PCC 140 is a personal contact card that describes the user of the first portable electronic device 100. The personal contact card may be stored in a portion of memory associated with the first address book 120, or may be stored in a separate memory (not shown) accessed by the first address book client 110. While portions of a personal contact card may have information elements similar to a contact record, it is important to distinguish a personal contact card from contact records described in this disclosure.

In the PCC 140, there may be information elements, shown as fields 142, 144, 146. For example, the information elements may be a name stored in field 142, user-specified interests stored in field 144, and an active interest field 146. Portions of the PCC 140 may be shared with other address books. For example, there may be a logical link, represented by double arrow 355 between the PCC 140 in the first address book 120 and a corresponding contact record 250 in the second address book 220. The logical link 355 operates in such a way that when the active interest field 146 is updated in the PCC 140, the corresponding contact record 250 is also updated in the second address book 220.

The second address book 220 may have a plurality of contact records 230. However, one of the contact records in the second address book 220, corresponding contact record 250 is logically linked 355 with the PCC 140 in the first address book 120. The logical link 355 may be implemented in a number of ways. For example, the first address book client 110 may periodically send a message to all address book clients that it knows to contain a corresponding contact record associated with PCC 140. Alternatively, the first address book client 110 may coordinate with a network based address book or a converged address book server to update a PCC 140 contact record. When the converged address book server receives an update to PCC 140, it may share the updated information with other address book clients that have "subscribed" to the PCC 140. When another address book client has subscribed to the PCC 140, it will have a corresponding contact record that is automatically updated based on the shared information in the PCC 140.

Figure 3:
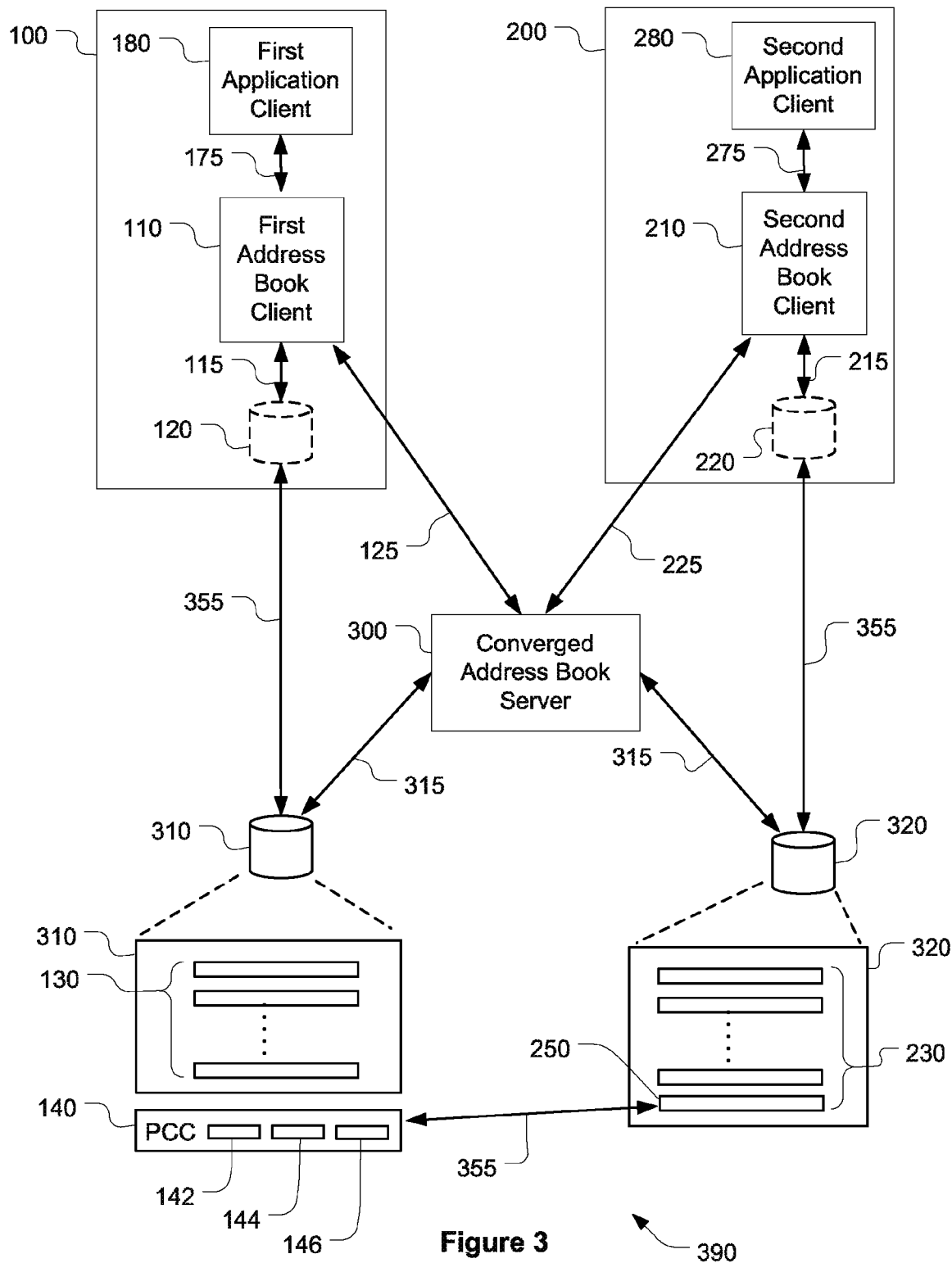
FIG. 3 is a diagram illustrating an example system in which a converged address book server may be used to share active interest information.

FIG. 3 is an illustration showing a converged address book system 390 that may comprise multiple address books.

A feature of a converged address book system 390 is that contact information describing a contact may be shared with corresponding contact records in the address books of other individuals. The sharing and management of address book information may be coordinated by a converged address book server 300. For example, a first address book client 110 may have a first communication link, shown as double arrow 125, with the converged address book server 300. The first communication link 125 allows the first address book client 110 to access, retrieve, update, or manage contact records in the first network based address book 310. The first network-based address book 310 may be located at a data storage device (not shown) and accessed by the converged address book server 300 via a protocol, shown as double-headed arrow 315. For example, the protocol may be HTTP, XML, SQL or any other protocol that allows the converged address book server 300 to access the first network-based address book 310. In FIG. 3, the first portable electronic device 100 may have the first address book 120 or may not have the first address book 120 if all the contact records are stored in the first network-based address book 310. In some implementations, the first address book 120 may be a duplicate or local copy of the first network-based address book 310. The double headed arrow 355 between the optional first address book 120 and the first network-based address book 310 represents that there may be a relationship between the optional first address book 120 and the first network-based address book 310, but the relationship does not require identical copies of the respective address books.

Similar to the first portable electronic device 100, a second portable electronic device 200 has a second communications link 225 with the converged address book server 300. The converged address book server 300 has a protocol 315 for accessing a second network-based address book 320. In FIG. 3, the second address book client 210 is a subscriber to the PCC 140 associated with the first address book client 110. Therefore, if the first address book client 110 updates, via the converged address book server 300, the active interest field 146 in PCC 140, the information is also updated in a corresponding contact record 250 in the second network-based address book 320.

In another embodiment, the converged address book server 300 may manage active interest information on behalf of the address book clients that utilize the converged address book server 300. For example, the first address book client 110 may transmit activity data to the converged address book server 300, and the converged address book server 300 may generate the active interest information associated with the user of the first address book client 110 based on the activity data. For example, the converged address book server 300 may have more resources or processing capabilities than the first address book client 110, making the generation of active interest information more efficient. Alternately, the converged address book server 300 may have access to a larger information resource for determining patterns of usage or appropriate active interest information. For example, the larger information resource may comprise statistical information associating various types of activity data with determined active interest information. In an implementation where active interest information is represented by keywords or tags, the converged address book server 300 may manage a list of keywords or tags, allowing for standardization or normalization of active interest information among a plurality of address book clients.

The converged address book server 300 may process contact records to identify "matching" active interest fields for contact records. For example, the converged address book server 300 may receive active interest information from the second address book client 210, indicative of a current or ongoing interest of the user of the second address book client 210. The converged address book server 300 may process the contact records 230 in the second network-based address book 320 to identify at least a first matching contact record. In this example, the converged address book server 300 may identify the corresponding contact record 250 has having an active interest field that matches the current or ongoing interest of the user of the second address book client 210. Optionally, the converged address book server 300 may prompt a communication between the user of the first address book client 110 and the second address book client 210.

As described previously, the converged address book server 300 may receive activity data, rather than active interest information. To process contact records to identify matching active interest fields, the converged address book server 300 may compare the active interest fields in contact records with the received activity data or may compare the active interest fields with generated active interest information (generated by the converged address book server 300 based on the received activity data). Therefore, it should be understood that the matching of active interest fields in contact records may be performed with received activity data, received active interest information, generated active interest information generated from activity data, or based on active interest information stored in active interest field of a contact record.

Matching of an active interest field with activity data or active interest information does not necessarily require an identical match, but may comprise a subset, superset, or logical relationship between the "matched" fields. A person of skill in the art would readily conceive of examples where shared interests could be represented by a variety of active interest information or activity data. For example, active interest information associated with viewing a re-run of a classic television program might be matched with an active interest field specifying a different classic television program. In this example, the matching might be based on the genre, relative time period, or a common actor or actress.

In some embodiments, the active interest information is removed from the active interest field of a contact record after a period of time. For example, a timer in the converged address book server 300, first address book client 110, or second address book client 210 may initiate a periodic review of the active interest field to remove stale active interest information. The active interest information may be associated with a timestamp in the active interest field. Alternatively, the active interest field may comprise a queue of entries having a fixed number of entries, where the earliest entry is removed whenever a new entry is added. When the active interest information is removed from the active interest field, the removal may be based upon a preconfigured time interval after updating the active interest field. In this way, it may be possible for the active interest field in the contact record to comprise only active interest information from a fixed time period starting before the present time and ending at the present time.

Figure 4:
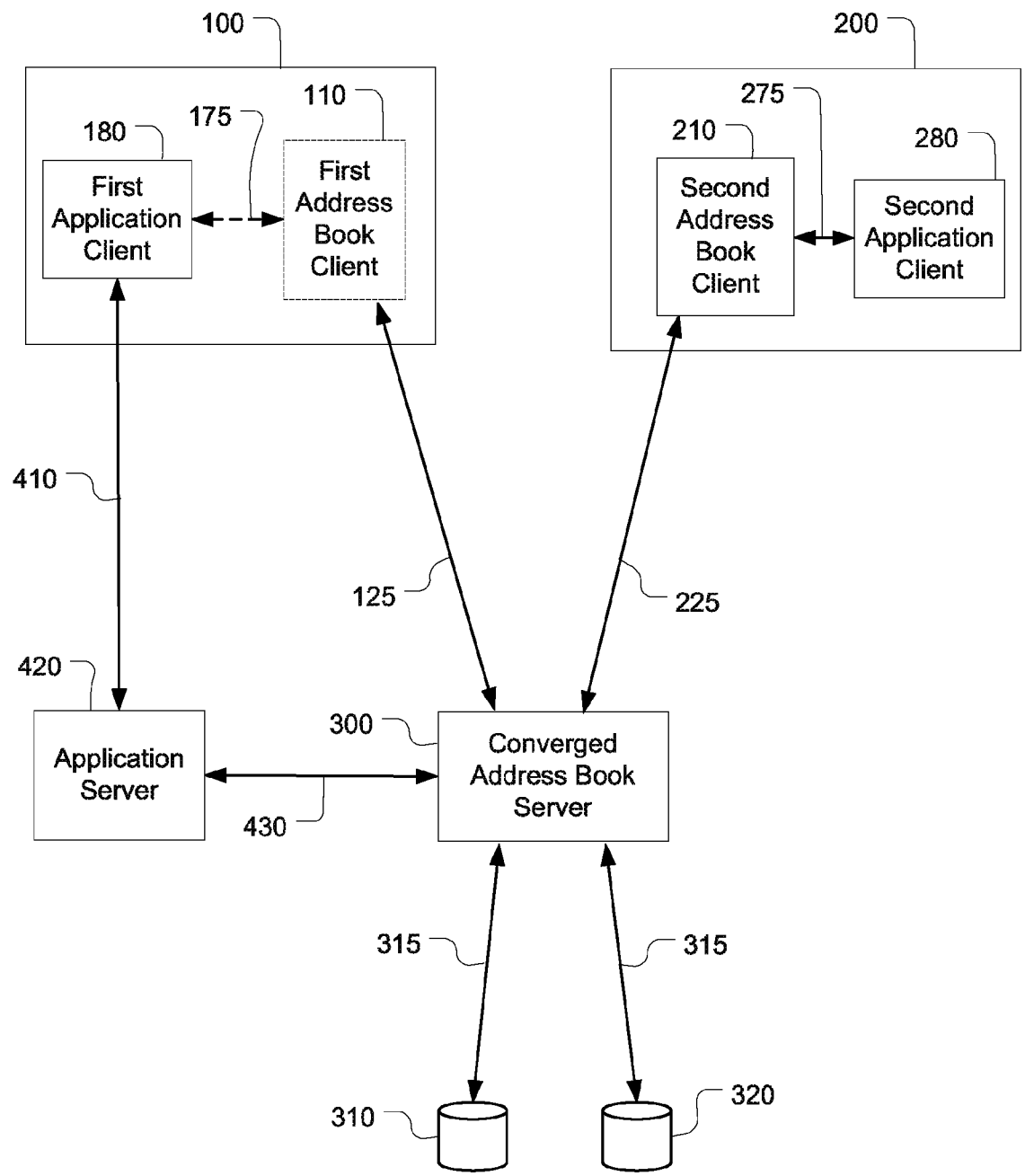
FIG. 4 is a diagram illustrating an example system in which a converged address book server may obtain activity data.

FIG. 4 provides an additional example of how the converged address book server 300 may obtain activity data or active interest information associated with a first address book client. In FIG. 4, there is an interface, represented by double headed arrow 430, between the converged address book server 300 and an application server 420. The application server 420 is logically associated with the first application client 180. For example, the application server 420 may be a media server providing media content to the first application client 180 (e.g. a media player application). In another example, the application server 420 may be a server associated with instant messaging applications, media storage applications, social network applications, or any other type of application used by the first application client 180. The application server 420 may be associated with a third party service provider or may be integral to the converged address book system.

In this example, the first portable electronic device 100 has a first application client 180 that is accessing (represented by double headed arrow 410) the application server 420. As previously described, first application client 180 may alternatively be external to the first portable electronic device 100. Although not used in the description of FIG. 4, the first portable electronic device 100 may optionally comprise an API 175 that enables access between an optional first address book client 110 and the first application client 180.

In FIG. 4, the application server 420 may send activity data or active interest information to the converged address book server 430 based on the use of the first application client 180. Alternatively, the converged address book server 300 may obtain the activity data or active interest information from the application server 420 by requesting, monitoring, or interfacing with the application server 420.

In one example, when the first application client 180 requests access to content from the application server 420, the application server 420 may communicate with the converged address book server 300 to determine whether the user of the first address book client 110 has proper subscription or credentials to access the content. If the request for access provides some description about the content requested, the request may be used as activity data, and the converged address book server 300 may generate active interest information based upon the request for access to the content.

The interface 430 between the converged address book server 300 and the application server 420 may be described in a variety of ways known to a person of skill in the relevant art. In one example, the interface 430 represents a communication protocol or link between the converged address book server 300 and the application server 420. In another example, the interface 430 may comprise a middleware, proxy, 3$^{rd}$ party service provider, network provider interface, or any component, method or system capable of sharing information from the application server 420 with the converged address book server 300.

In a specific example, application server 420 may be associated with a media service aggregator and may interact with a first application client 180 (either on first portable electronic device 100 or on another machine). The application server 420 may be configured to generate and transmit active interest information (such as a viewing indication, viewing history, sharing notification, or user rating indicator, etc) to a social networking application, based on a subscriber's access of the application server 420 from a first application client 180. In this example, the converged address book server 300 may receive updates from the social networking application to integrate the active interest information into the active interest field of a contact record associated with the user of the social networking application. This allows contact records associated with the user of the first application client 180, to be updated in other users' address books.

Figure 5:
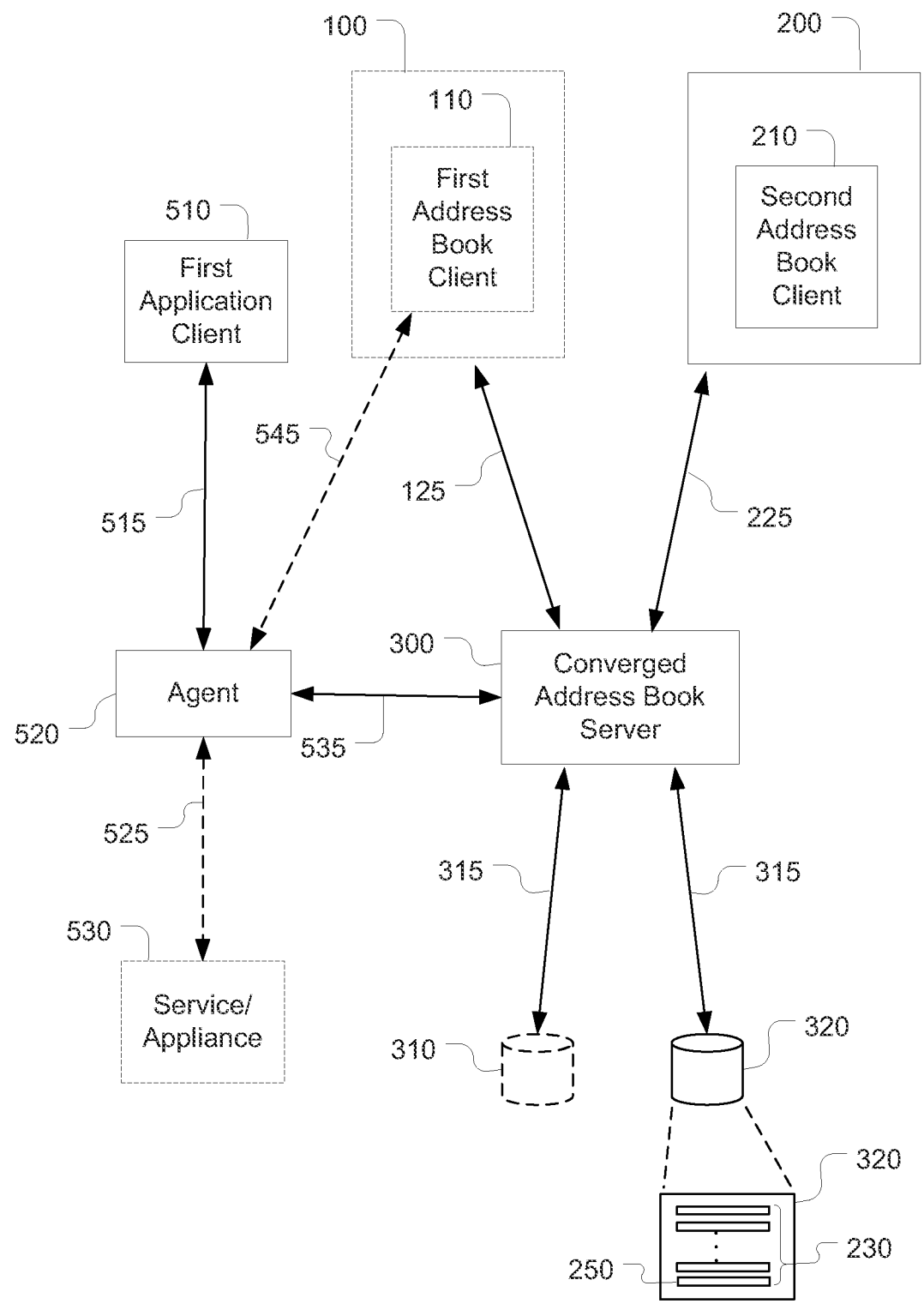
FIG. 5 is a diagram illustrating another example system in which a converged address book server may obtain activity data.

FIG. 5 provides an additional example of how the converged address book server 300 may obtain activity data or active interest information based on use of a first application client. In FIG. 5, the first application client 510 is shown separate from the optional first portable electronic device 100. For example, the first application client 510 may be an application executed on a media player, personal computer, network enabled television, or any other machine which may execute an application client. In one embodiment, the first application client 510 may be accessing content from a service or appliance 530. For example, the first application client 510 may be a media player and the service/appliance 530 may be a digital video recording appliance or may be a media serving appliance. In this example, the first application client 510 is used by a first user.

Similar to previous figures, FIG. 5 depicts a second address book client 210 associated with a second portable electronic device 200. The second portable electronic device 200 has a second communications link 225 with the converged address book server 300. The converged address book server 300 has a protocol 315 for accessing a second network-based address book 320. The converged address book server 300 may also have access to other network-based address books, such as optional first network-based address book 310. In FIG. 5, the second network based address book 320 has a plurality of contact records 230, including contact record 250 having contact information about the first user.

FIG. 5 depicts an agent 520 logically connected with the converged address book server 300. The agent 520 may also be referred to as an agent application, proxy application, helper application, remote control application, remote monitoring application, or any other terms to refer to an agent that is capable of obtaining activity data or active interest information based on use of the first application client 510. The agent 520 may also be a component of the first portable electronic device 100, a component of the first application client 510, or may be a component in other machine. In this example, an agent 520 has a server reporting link, shown by double headed arrow 535, with the converged address book server 300. The agent 520 may have an application monitoring link, shown by double arrow 515.

In some embodiments, the application monitoring link 515 may comprise a reporting function (not shown) of the first application client 510, where the reporting function sends activity data or active interest information to the agent 520. In other embodiments, the application monitoring link 515 may comprise a collecting function (not shown) of the agent 520, wherein the collection function obtains activity data or active interest information from the first application client 510. The agent 520 may also collect activity data by monitoring a network link utilized by the first application client 510. For example, if the first application client 510 is a media player, the agent 520 may be positioned relative to the first application client 510 to monitor network requests for media content.

Similar to the application monitoring link 515, the agent may have a service monitoring link, shown as double headed arrow 525. The service monitoring link 525 may be implemented using common techniques, such as a reporting capability of the service/appliance 530, a polling capability of the agent 520, or a network monitoring capability of the agent 520.

As the agent 520 obtains activity data or active interest information from either the first application client 510 or the service/appliance 530, the agent 520 prepares and transmits active interest information via the server reporting link 535 to the converged address book server 300. If the agent 520 obtains activity data, it may generate active interest information based on the activity data. The agent 520 may also transmit user identifying information to the converged address book server 300, such as user identifying information about the first user. For example, the user identifying information may be collected from the first application client 510 or the service/appliance 530. Alternatively, the user identifying information may be pre-configured in the agent 520. In another example, the agent 520 may send agent identification information, identifying the agent 520. The converged address book server 300 may utilize the agent identification information to obtain the user identifying information from a data source.

The converged address book server 300 in FIG. 5 may operate according to methods described in this disclosure. When the converged address book server 300 receives the active interest information associated with the first user, it may update a contact record describing the first user in another user's address book. Alternatively, the converged address book server 300 may update a personal contact card describing the first user, which causes updates to corresponding contact records in other address books.

In an alternative embodiment, the agent 520 may use a device reporting link, shown by double headed arrow 545, for communicating active interest information or activity data to a first address book client 110 on the first portable electronic device 100. For example, the agent 520 may be an agent on the first portable electronic device 100 and may communicate active interest information via the device reporting link 545 to the first address book client 110. The first address book client 110 could communicate the active interest information to the converged address book server 300 via a first communication link 125, or may update a PCC associated with the user of the first portable electronic device 100.

It should be understood that the application monitoring link 515, service monitoring link 525, and device reporting link 545 may be implemented using one of a variety of communication protocols, access protocols, or application programming interfaces. For example, the link may be a polling script, a socket based connection, hypertext transfer protocol (HTTP) communication, extensible markup language (XML), or any protocol that enables communication between applications. Examples of access protocols may include, without limitation, short range radio frequency communication, wireless cellular technologies, wireless networking technologies, or wired connectivity.

Figure 6:
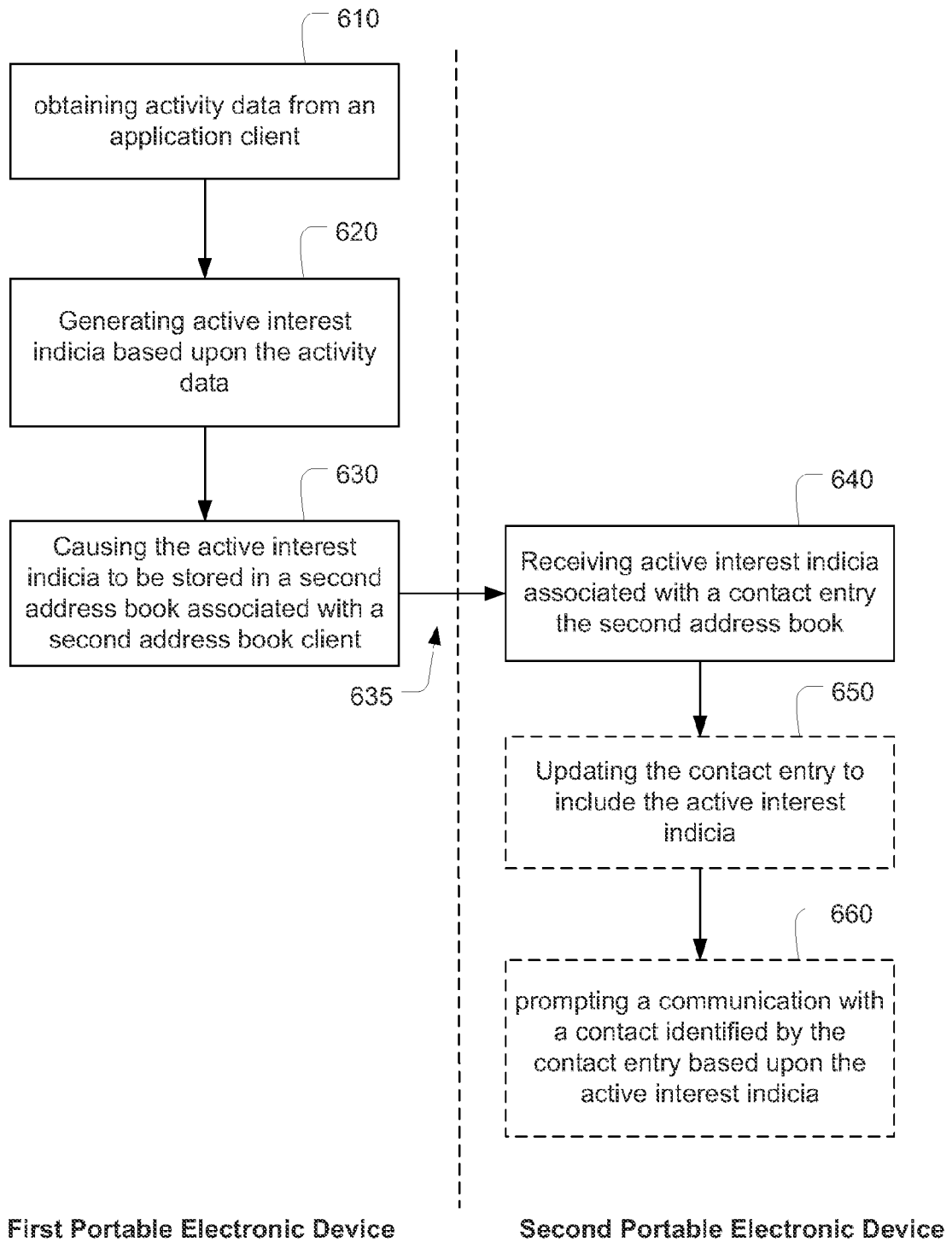
FIG. 6 is a flowchart illustrating example methods in accordance with an embodiment described in the present disclosure.

FIG. 6 depicts a method for a first portable electronic device and a method for a second portable electronic device. On the left side, at block 610, the first portable electronic device obtains activity data from an application client. At block 620, the first portable electronic device generates active interest information based upon the activity data. At block 630, the first portable electronic device causes the active interest information to be stored in a second address book associated with a second address book client. The first portable electronic device causes the active interest information to be used to update an active interest field in a contact record describing the user of the first portable electronic device.

The arrow 635 indicates that the first portable electronic device may share the active interest information to the second portable electronic device in a variety of ways. In one example, the active interest information may be communicated by a first address book client, and may be transmitted via a wireless communication network. In another example, the active interest information may be shared by updating a personal contact card associated with the first portable electronic device, the personal contact card being shared with the second address book client. As described in this disclosure, the active interest information may be shared via a converged address book server or directly between address book clients of the first portable electronic device and second portable electronic device, respectively.

The right side of FIG. 6 depicts an example method in a second portable electronic device. At block 640, the second portable electronic device receives the active interest information associated with a contact record in the second address book. The second address book may be stored at the second portable electronic device or may be accessible, via a wireless network, by a second address book client on the second portable electronic device. At block 650, the second portable electronic device may optionally update the contact record to include the active interest information. In other example methods, the second portable electronic device may not update the contact record but may instead use the active interest information to prompt communication or may inform the user of the second address book client regarding the active interest information associated with the contact record. At block 660, the second portable electronic device may optionally prompt a communication with a contact identified by the contact record based upon the active interest information. For example, if the user of the second portable electronic device is also engaged in an activity related to the active interest information associated with the contact record, the second portable electronic device may prompt a communication between the user of the second portable electronic device and the contact identified by the contact record.

Figure 7:
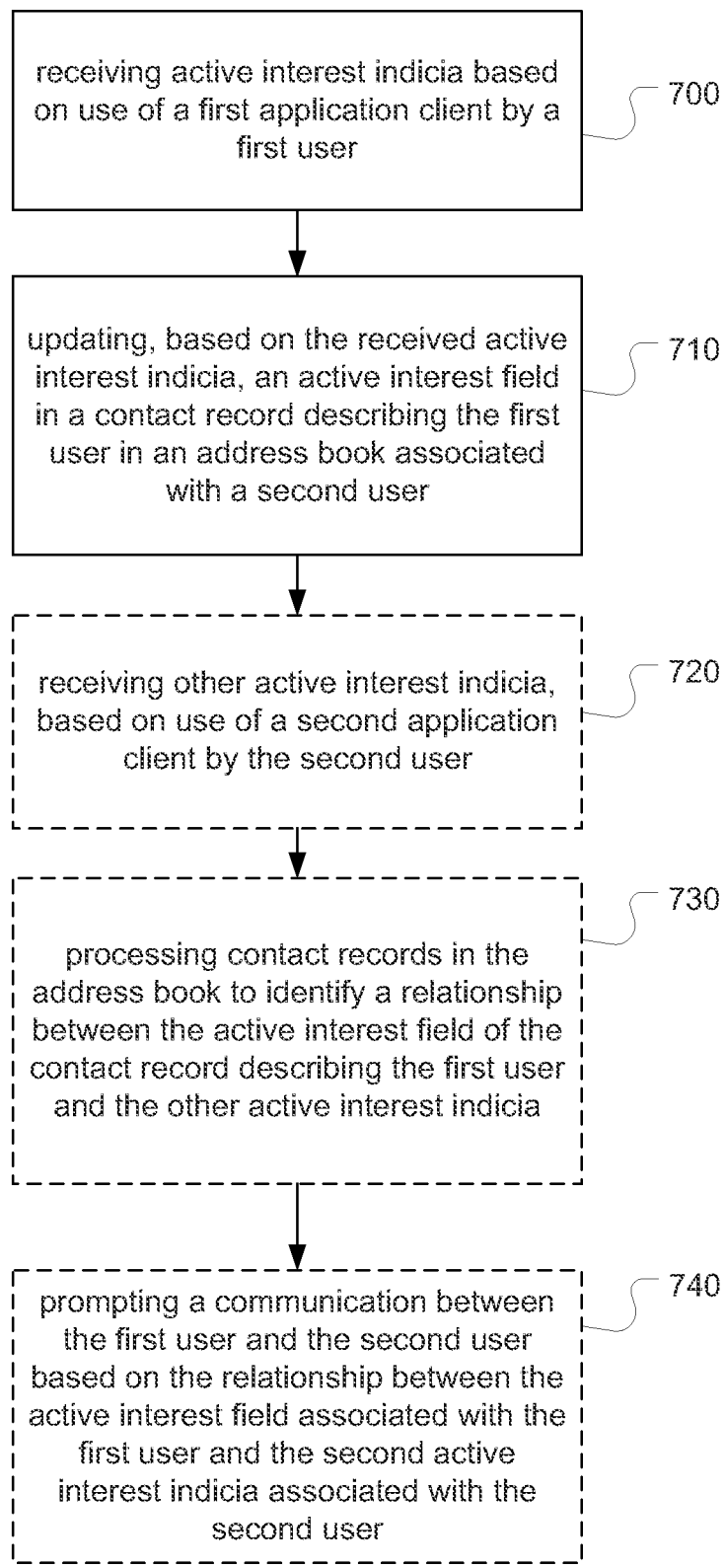
FIG. 7 is a flowchart illustrating an example method in a server receiving active interest information from at least one address book client.

FIG. 7 illustrates an example method for a server in accordance with the present disclosure. At block 700, the server receiving active interest information based on use of a first application client by a first user. The server may receive the active interest information from an application server, first address book client, or agent. Alternatively, the server may receive activity data and generate active interest information based upon the received activity data.

At block 710, the server updates, based on the received active interest information, an active interest field in a contact record describing the first user in an address book associated with a second user. This operation may include the sharing of an active interest field in a personal contact card associated with the first user. For example, the server may update any corresponding contact records for one or more address books which subscribe to the personal contact card of the first user. Alternatively, the server may update contact records that identify the first user in one or more address books.

At optional block 720, the server may receive other active interest information, based on use of a second application client by the second user. For example, the other active interest information may be received from a second address book client. At optional block 730, the server may process contact records in the address book associated with the second user to identify a relationship between the active interest field of the contact record describing the first user and the other active interest information of the second user. In one embodiment, the optional block 730 may comprise an operation to identify a matching contact record based on a logical relationship between the active interest field of the matching contact record and the other active interest information. The matching contact record may be the contact record describing the first user that was updated in block 710. The server may identify one matching contact record or may identify several matching contact records.

At block 740, the server may optionally prompt a communication between the first user and the second user based on a relationship between the active interest field associated with the contact record describing the first user and the second active interest information associated with the second user.

Figure 8:
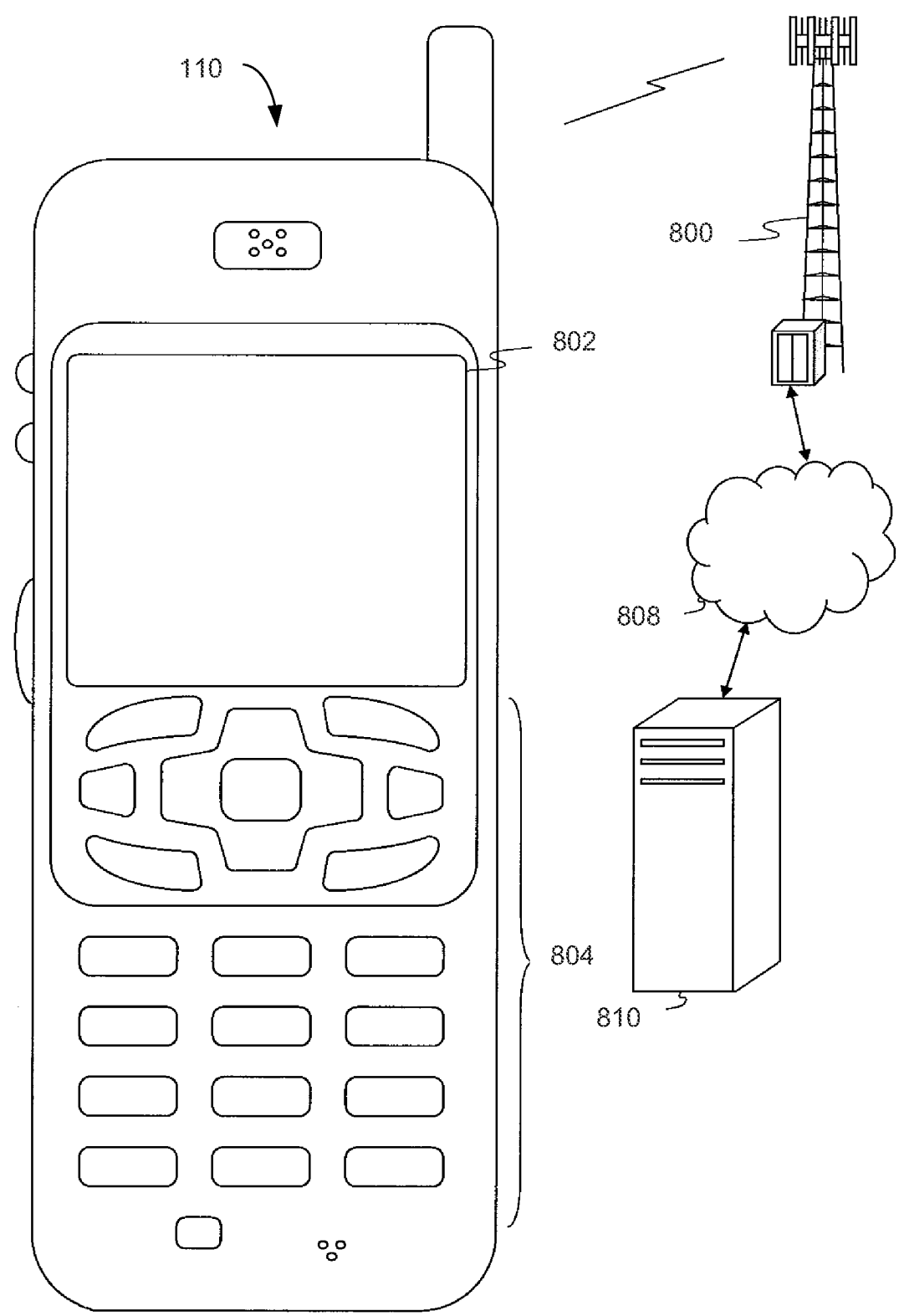
FIG. 8 illustrates a wireless communications system including an embodiment of a portable electronic device.

FIG. 8 illustrates an example embodiment of a wireless communications system according to an aspect of the present disclosure, including an example embodiment of a portable electronic device 110. The portable electronic device 110 is operable for implementing aspects of the disclosure, but the disclosure should not be limited to these implementations. Modern portable electronic devices continue to benefit from improvements in processor design, memory, battery solutions, manufacturing processes, and software design. Portable electronic devices may have a variety of sizes, shapes, and features. For example, a portable electronic device 110 may be (or be a part of) a smart phone, wireless router, relay, laptop computer, tablet computer, GPS-enabled device, Navigation System, wireless mobile tracking device or any other device which may enable communication via a wireless network 800.

The portable electronic device 110 may include a display 802. The portable electronic device 110 may also include a touch-sensitive surface, a keyboard or other input keys generally referred as 804 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The portable electronic device 110 may present options for the user to select, controls for the user to actuate, and/or cursors or other indicators for the user to direct. For example, a prompt to initiate communication with a contact may be actuated by an input portion 804 of the portable electronic device 110.

Among the various applications executable by the portable electronic device 110 is, for example, an address book application, which may be used to present contact information on the display 802. In some embodiments, the contact information may be obtained via wireless communications with a wireless network access node, a cell tower, a peer portable electronic device 110, or any other wireless communication network or system 800. The network 800 may be coupled to a wired network 808, such as the Internet. Via the wireless link and the wired network, the portable electronic device 110 can have access to information on various servers, such as a server 810. The server 810 may provide content that may be shown on the display 802. Alternately, the portable electronic device 110 may access the network 800 through a peer portable electronic device 110 acting as an intermediary, in a relay type or hop type of connection. A portable electronic device 110 may be operable to transmit over one or more of any suitable wireless networks 800, known in the art.

Figure 9:
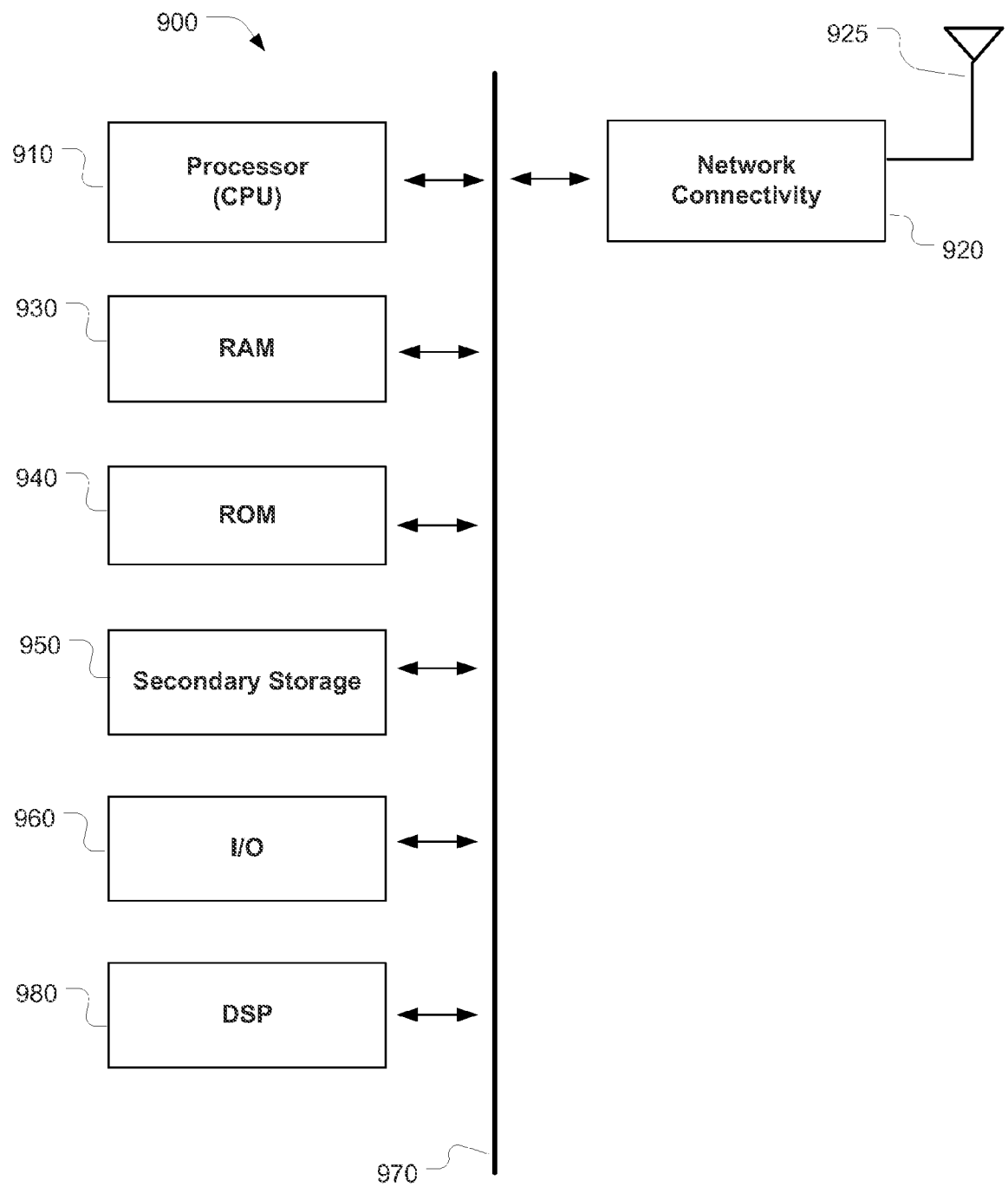
FIG. 9 is a diagram illustrating a processor and related components suitable for implementing several embodiments described in this application.

The portable electronic device 110, converged address book server 300, and other components described above may include a processing component that is capable of executing instructions related to the actions described above. FIG. 9 illustrates an example embodiment of a system 900 that includes a processing component 910 suitable for implementing one or more of the embodiments earlier described herein. In addition to the processor 910 (which may be referred to as a central processor unit or CPU), the system 900 may include network connectivity devices 920, random access memory (RAM) 930, read only memory (ROM) 940, secondary storage 950, and input/output (I/O) devices 960, location module 990, data module 995, filter module 955. These components may communicate with one another via a bus 970. In some cases, some of these components may not be present or may be combined in various combinations with one another or with other components not shown. These components may be located in a single physical entity or in more than one physical entity. Any actions described herein as being taken by the processor 910 might be taken by the processor 910 alone or by the processor 910 in conjunction with one or more components shown or not shown in the drawing, such as a digital signal processor (DSP) 980. Although the DSP 980, is shown as a separate component, the DSP 980 may be incorporated into the processor 910. Although the recipient callback module 945, filter module 955, location module 990, and data module 995 are shown as separate components, any of them may be incorporated into the processor 910 or may be implemented using one or more components shown in FIG. 9.

The processor 910 executes instructions, logic, codes, computer programs, or scripts that it may access from the network connectivity devices 920, RAM 930, ROM 940, or secondary storage 950 (which might include various disk-based systems such as hard disk, floppy disk, or optical disk). While only one CPU 910 is shown, multiple processors may be present. Thus, while instructions may be discussed as being executed by a processor, the instructions may be executed simultaneously, serially, or otherwise by one or multiple processors. The processor 910 may, for example, be implemented as one or more CPU chips or modules. The processor 910 may also be integrated with other functions of portable electronic device 110 in or on a single chip or module.

The network connectivity devices 920 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 920 may enable the processor 910 to communicate with the Internet or one or more telecommunications networks or other networks from which the processor 910 might receive information or to which the processor 910 might output information. The network connectivity devices 920 might also include one or more transceiver components 925 capable of transmitting and/or receiving data wirelessly.

The RAM 930 might be used to store volatile data and perhaps to store instructions that are executed by the processor 910. The ROM 940 is a non-volatile memory device that in some cases has a smaller memory capacity than the memory capacity of the secondary storage 950. ROM 940 might be used to store instructions and perhaps data that are read during execution of the instructions. Access to both RAM 930 and ROM 940 is typically faster than to secondary storage 950. The secondary storage 950 is typically comprised of one or more disk drives or tape drives and might be used for non-volatile storage of data or as an over-flow data storage device if RAM 930 is not large enough to hold all working data. However, the secondary storage 950 could be implemented using any appropriate storage technology, including so-called "solid state disk", FLASH, EEPROM, or other generally non-volatile or persistent storage. Secondary storage 950 may be used to store programs that are loaded into RAM 930 when such programs are selected for execution.

The I/O devices 960 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 925 might be considered to be a component of the I/O devices 960 instead of or in addition to being a component of the network connectivity devices 920. Some or all of the I/O devices 960 may be substantially similar to various components depicted in the previously described drawing of the portable electronic device 110, such as the display 802 and the input 804.

Figure 10:
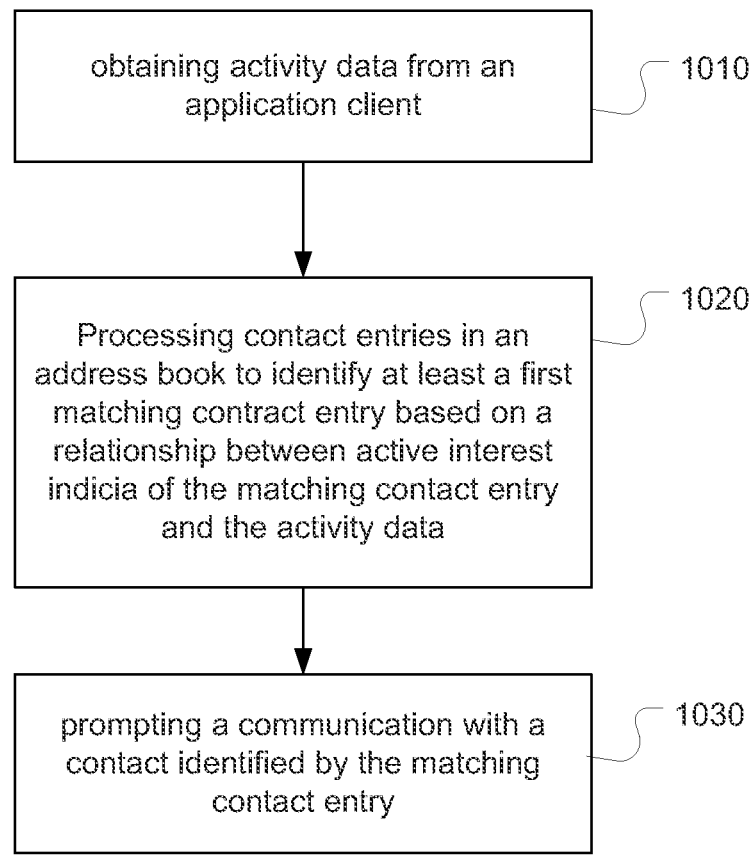
FIG. 10 is a flowchart illustrating an example method in a portable electronic device for prompting a communication based on active interest information.

FIG. 10 illustrates another example method for a portable electronic device. In FIG. 10, the portable electronic device obtains activity data from an application client at block 1010. For example, an address book client in the portable electronic device may receive the activity data from an application client in the portable electronic device. Alternatively, a helper application may have access to activity data generated by an application client, and access the activity data from a portion of memory in the portable electronic device. At block 1020, the portable electronic device processes contact records in an address book to identify at least a first matching contract record based on a relationship between an active interest field of the matching contact record and the activity data. The address book may be a network based address book, or may be an address book stored in a memory of the portable electronic device. In some embodiments of this method, the portable electronic device may generate current active interest information based upon the activity data and then use the current active interest information to find a matching contact record having an active interest field related to the current active interest information. At block 1030, the address book client may prompt a communication with a contact identified by the matching contact record.

A person skilled in the art will appreciate that the embodiments described herein may be modified without departing from the scope of the present disclosure. For example, in one embodiment, there may be a converged address book system, comprising: a first address book client associated with a first user and a first address book; a second address book client associated with a second user and a second address book; a server configured to: receive active interest information from the first address book client based on use of a first application client by the first user; and update, in the second address book, an active interest field in a contact record describing the first user based on the active interest information received from the first address book client. The converged address book system may receive an updated personal contact card from the first address book client, the updated personal contact card comprising the active interest information. The converged address book system may transmit the active interest information to the second address book client via a network.

The steps, processes, or operations described herein are examples. There may be many variations to these steps or operations without departing from the scope of this disclosure. For instance, where appropriate, the steps may be performed in a differing order, or steps may be added, deleted, or modified. Although example embodiments of this disclosure have been depicted and described in detail herein, it will be apparent to those skilled in the relevant art that various modifications, additions, substitutions, and the like can be made without departing from the concepts and embodiments disclosed herein, and these are therefore considered to be within the scope of the present subject matter as defined in the following claims.

What is claimed is:

1. A method performed by a converged address book (CAB) server, comprising:
  receiving from a first user device historical activity data associated with a first application client;
  generating active interest information associated with a first user based on the historical activity data, wherein the active interest information comprises a tag that identifies an interest of the first user;
  updating, based on the received active interest information, an active interest field in a contact record describing the first user in a converged address book associated with a second user to specify the active interest information of the first user;
  receiving second active interest information, the second active interest information associated with the second user, the second active interest information comprising a second tag that identifies a second interest;
  processing contact records in the converged address book associated with the second user to determine whether the active interest field of the contact record describing the first user and the second active interest information match; and
  prompting a communication between the first user and the second user when the active interest field of the contact record describing the first user and the second active interest information match.

2. The method of claim 1, wherein the active interest information associated with the first user is based on use of the first application client by the first user on the first user device.

3. The method of claim 1, wherein second active interest information associated with the first user is received from a first address book client associated with the first user on the first user device, the second active information comprising a second tag that identifies a second interest.

4. The method of claim 1, wherein updating comprises:
  communicating the active interest information associated with the first user to a second address book client via a network.

5. The method of claim 1, wherein updating comprises:
  storing the active interest information associated with the first user in a data storage device configured to store the converged address book associated with the second user.

6. The method of claim 1, wherein prompting comprises:
  initiating a communication session between the first user and the second user.

7. The method of claim 6, wherein initiating comprises:
  communicating a message to one of a first address book client and a second address book client which causes notification to the first user or the second user, respectively.

* * * * *